(12) United States Patent
Chen (10) Patent No.: US 9,937,973 B2
(45) Date of Patent: Apr. 10, 2018

(54) FORE-AFT SELF-BALANCING TRANSPORTATION DEVICE WITH LOW AND CENTERED FOOT PLATFORM

(71) Applicant: Shane Chen, Camas, WA (US)

(72) Inventor: Shane Chen, Camas, WA (US)

( * ) Notice: Subject to any disclaimer, the term of this patent is extended or adjusted under 35 U.S.C. 154(b) by 0 days.

(21) Appl. No.: 14/811,702

(22) Filed: Jul. 28, 2015

(65) Prior Publication Data

US 2016/0332690 A1    Nov. 17, 2016

Related U.S. Application Data

(60) Provisional application No. 62/191,839, filed on Jul. 13, 2015, provisional application No. 62/029,990, filed on Jul. 28, 2014.

(51) Int. Cl.
| | |
|---|---|
| B62K 1/00 | (2006.01) |
| B62K 3/00 | (2006.01) |
| B60K 1/00 | (2006.01) |
| B60K 1/02 | (2006.01) |
| B60L 11/18 | (2006.01) |

(52) U.S. Cl.
CPC ............... B62K 3/007 (2013.01); B60K 1/00 (2013.01); B60K 1/02 (2013.01); B60L 11/18 (2013.01); B62K 1/00 (2013.01)

(58) Field of Classification Search
CPC . B62K 3/007; B62K 1/00; B60K 1/02; B60K 1/00; B60L 11/18
See application file for complete search history.

(56) References Cited

U.S. PATENT DOCUMENTS

| | | | | |
|---|---|---|---|---|
| 5,320,372 A | * | 6/1994 | Langen | B62K 1/00 280/207 |
| 6,561,294 B1 | | 5/2003 | Kamen | |
| 7,543,834 B2 | | 6/2009 | Gozcey | |
| 8,459,667 B2 | * | 6/2013 | Ungar | B62K 1/00 280/87.01 |
| 8,807,250 B2 | * | 8/2014 | Chen | B62K 1/00 180/21 |
| 2003/0228961 A1 | * | 12/2003 | Huang | B62K 1/00 482/110 |
| 2005/0275188 A1 | * | 12/2005 | Lee | B62K 1/00 280/205 |
| 2006/0038372 A1 | * | 2/2006 | Goczey | B62K 1/00 280/205 |
| 2008/0143073 A1 | | 6/2008 | Unger | |
| 2008/0147281 A1 | | 6/2008 | Ishii | |
| 2009/0032323 A1 | | 2/2009 | Kakinuma | |
| 2009/0266629 A1 | | 10/2009 | Simeray | |

(Continued)

*Primary Examiner* — Drew Brown
(74) *Attorney, Agent, or Firm* — Steven J. Sullivan (57) ABSTRACT

A motorized, fore-aft self-balancing transportation device that may include a single wheel structure with a drive motor, a battery and first and second foot platforms located on opposite sides of the wheel. The device may be uniquely be arranged such that the motor and battery are positioned such that there is space within the wheel envelope for a portion of the foot platform (positioned near or within the envelope), thereby placing the weight of the rider low and close to the center of gravity of the device. Various battery and motor arrangements are disclosed, as are different drive mechanisms and component redundancy to assure safe operation in the event of failure.

25 Claims, 9 Drawing Sheets

(56) References Cited

U.S. PATENT DOCUMENTS

| | | | |
|---|---|---|---|
| 2012/0032496 A1* | 2/2012 | Takenaka | B60B 19/003 301/5.23 |
| 2012/0168236 A1* | 7/2012 | Hamaya | B62K 1/00 180/21 |
| 2012/0173107 A1* | 7/2012 | Takenaka | B62K 3/007 701/70 |
| 2014/0058600 A1* | 2/2014 | Hoffmann | B62K 3/007 701/22 |

* cited by examiner

FORE-AFT SELF-BALANCING TRANSPORTATION DEVICE WITH LOW AND CENTERED FOOT PLATFORM

CROSS REFERENCE TO RELATED APPLICATIONS

This application claims the benefit of Provisional Patent Application No. 62/191,839 having the same title and inventor as above and Provisional Patent Application No. 62/029,990 entitled Low Wear Drive Mechanism and Single Wheel Transport Device Having Same and having the same inventor as above.

FIELD OF THE INVENTION

The present invention relates to a motorized, single-wheel structure, fore-aft balancing transportation device and, more specifically, to such a device in which the weight of a rider is borne low and toward the center of gravity of the device, among other features.

BACKGROUND OF THE INVENTION

The prior art includes motorized single wheel, self-balancing transportation devices. For example, FIGS. 1 and 3 of U.S. Pat. No. 8,616,313 (issued to Simeray for a Motorized Transport Vehicle for a Pedestrian) and FIGS. 1 and 6 of U.S. Pat. No. 8,807,250 (to Chen, the inventor herein, for a Powered Single-Wheeled Self-Balancing Vehicle for Standing User) illustrate such devices.

These figures represent at least two features of known single wheel transport devices. One is that the foot platforms are arranged so that a user, when riding, places his or her feet parallel to one another and aligned front to back, similar to how a person might stand while skiing. Another is that the motor and/or battery are placed within the wheel, for example, within the "envelope" of the wheel. One reason that the foot platforms are arrange in parallel is that the space within the wheel is occupied by the motor and/or battery and, therefore, there is insufficient space for the foot platform to extend into the wheel or wheel "envelope" (for purposes of this application, the wheel "envelope" refers to the space bounded by the wheel itself and the two parallel vertical side planes, one each on the exterior left and right sides of the wheel).

When standing, however, humans normally prefer to have the balls (i.e., front) of their feet turned slightly outward, often at 10-45 degrees (or other angle, depending on the person) from a line straight forward. Standing in this manner provides stability both front-to-back and side-to-side. A person standing with feet close together and parallel is less stable, side-to-side, than a person standing with the balls of their feet slightly splayed out.

Furthermore, when using a single wheel device, the center of weight, from a side to side perspective, is under the center of the wheel. If the feet are placed further out to the side and one foot is lifted, then the top of the wheel automatically tilts toward the non-lifted foot (with greater force the further out the foot is), thus small adjustments in weight (for example, mildly shifting one's weight) can cause significant instability in the device.

If the heel of a user or, in other words, the platform section on which the heel is placed, can be positioned closer to the center of gravity (side-to-side) of the wheel, then the device will be more stable.

In addition, the lower the platform, the more stable the device. Hence, it is desired to also have a user stand such that their heels are positioned relatively low to the ground. This also makes it easier and safer for a rider to get on or off the device.

SUMMARY OF THE INVENTION

Hence, it is an object of the present invention to provide a single wheel structure fore-aft self-balancing device in which a user rides with his or her heels close together and low to the ground, near the center of gravity of the device.

It is another object of the present invention to provide a single wheel structure fore-aft self-balancing device with a foot platform that extends into the wheel envelope.

It is also an object of the present invention to provide a single wheel structure fore-aft self-balancing device in which one of the battery and motor is positioned substantially forward and the other is place substantially rearward.

It is yet another object of the present invention to provide a single wheel structure fore-aft self-balancing device that offers redundancy in its drive and/or control mechanisms, and a safe shutdown mode in the event of failure.

These and related objects of the present invention are achieved by use of a single wheel structure, self-balancing transportation device with low and centered foot platform as described herein.

The attainment of the foregoing and related advantages and features of the invention should be more readily apparent to those skilled in the art, after review of the following more detailed description of the invention taken together with the drawings.

DETAILED DESCRIPTION

Figure 1:
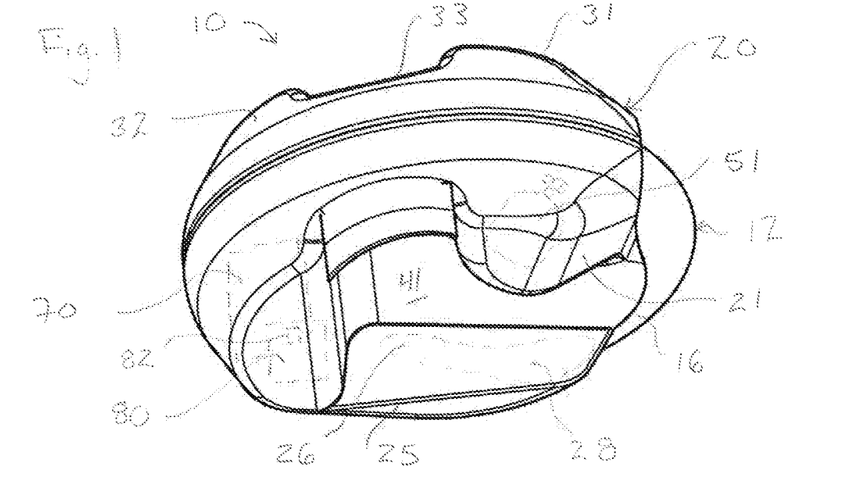
FIGS. 1-6 illustrate one embodiment of a single-wheel, self-balancing transportation device in accordance with the present invention.
Figure 2:
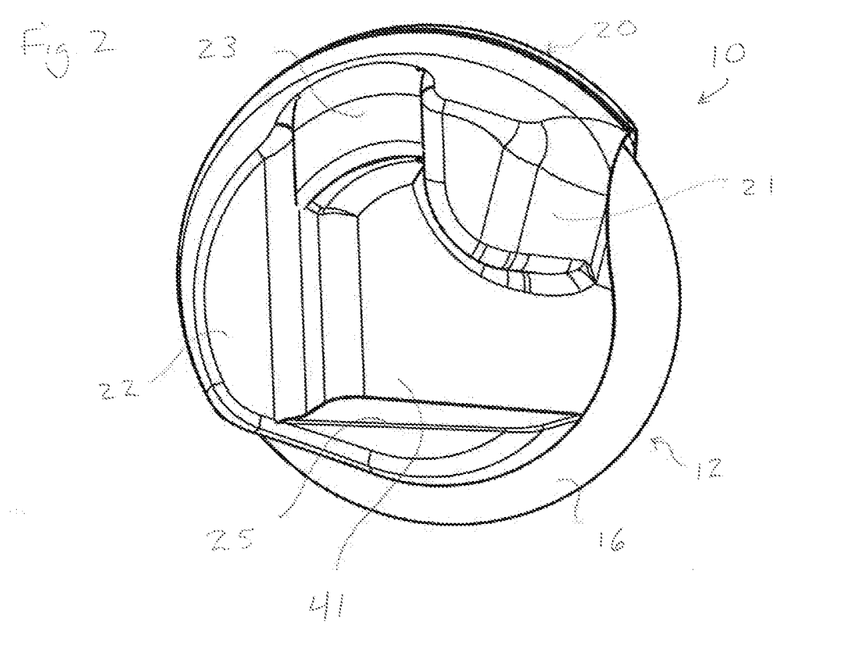

Referring to FIGS. 1-2, an upper right side perspective view and a side view, respectively, of a single-wheel, self-balancing transportation device 10 in accordance with the present invention are shown. Note that "right" is from the perspective of the rider. Device 10 may include a wheel 12, having a rim 14 (shown in FIGS. 4-6) and a tire 16, drive motors 51,52, batteries 70,71, and control circuits 80,81. A housing 20 covers portions of wheel 12 and drive motors 51,52, batteries 70,71 and control circuits 80,81. Drive motor 51, battery 70 and control circuit 80 are shown in phantom lines because they are obscured by the housing (their relative and approximate positions are shown). Drive motor 52, battery 71 and control circuit 81 are located on the opposite side of wheel 12, substantially symmetrically arranged.

FIG. 1 illustrates two "humps" or "protrusions" 21,31 and 22,32 per side (left and right side), with one protrusion 21,31 covering the drive motor 51,52 and the other protrusion 22,32 covering the batteries 70,71 and control circuits 80,81. Between these two protrusions is a leg recess 23,33 that may contact, in a preferred embodiment, the inside of the lower leg of a user below or at the knee, during use. A foot platform 25 is located toward a bottom of the device, adjacent a lower portion of wheel 12. The foot platform 25 has a heel region 26 and a ball region 28. A similar foot platform 35 (with heel region 36) is provided on the other side of the wheel for the rider's left foot (and is substantially symmetrically arranged). The leg recesses 23,33 are substantially aligned over their corresponding heel regions 26,36, respectively. It should be noted that the foot platforms (and indentations 41,42 discussed below) are preferably configured so the "central longitudinal axis" of the foot of a rider standing on a platform with their heel in the heel region has an angle greater than zero from straight ahead. This angle may range from 5-45 degrees or other.

Figure 3:
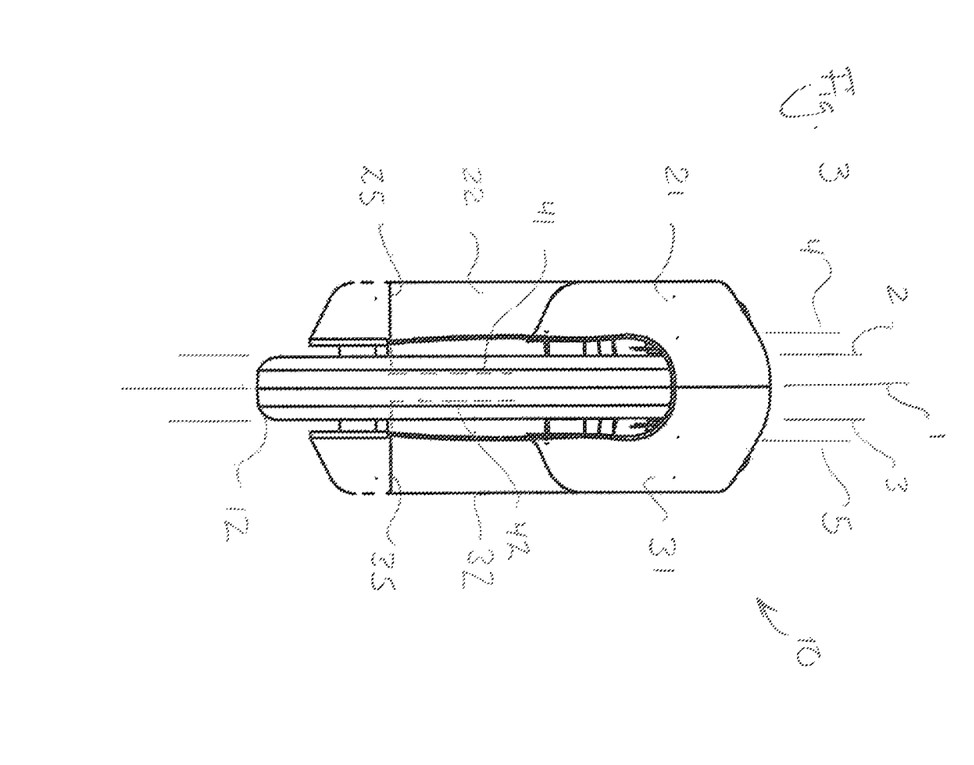

Referring to FIG. 3, a front elevation view of device 10 is shown. FIG. 3 illustrates a central vertical plane 1 that transects the center of the wheel 12 in the longitudinal or fore-aft dimension. Right side and left side vertical wheel edge planes 2,3 are parallel to the vertical plane and touch the outer edge of their respective sides of the wheel. As noted above, the space bordered by wheel 12 and the right and left wheel edge planes 2,3 may be termed the wheel "envelope." Lines 4,5 represent the inward extent of the leg recesses 23,33.

Each leg recess 23,33 provides several benefits including but not limited to:
  visually directing the leg of a rider to where it should be placed when mounting and riding the device;
  facilitating placement of the heel in the heel region 26,36;
  permitting a rider's leg to be placed low, close to the bottom portion of the wheel, and inwardly, close to the center of gravity of the device thereby enhancing stability; and
  providing a sense of security and reassurance, particularly for new riders, by providing several points of contact (shin, back of leg, inside of heel and/or ball, etc.) while not being restrictive or inhibiting quick dismount from the device (hence the benefits of the U.S. Pat. No. 8,807,250 without the limitations of the U.S. Pat. No. 8,616,313).

To some extent, the housing (and drive motors and battery) arrangement provide a contoured surface that resembles or approaches, loosely, half a ski boot—hence making foot and leg placement more inherent.

Furthermore, by placing the motor and the battery, the bulkier and heavier components of the device, towards the front and/or rear, those components are not placed within the wheel and thus the heel region 26,36 of the platforms can both (1) extend into the wheel envelope close to the central vertical plane and center of gravity and (2) be placed lower down, just over and/or adjacent a lower portion of the wheel (in other words, the battery and drive mechanism do not impede the heel region being positioned inward and low; this in turn permits the heel and lower leg to the user to be positioned low and immediately adjacent or within the wheel envelope).

This arrangement allows the weight of the user to be placed low and very close to the center of gravity and thereby affords significant stability and ease-of-use to the device, in a manner not exhibited by other devices. Furthermore, by creating space near or within the wheel for the heel region, the ball of a rider's foot may be angled outward (relative to the heel) which is both a more natural position for a person to stand in and improves lateral (i.e., side-to-side) balance.

FIG. 3 also shows the relative position of the drive motor housing protrusions 21,31 (housing motors 51,52, respectively), battery protrusions 22,32, and foot platforms 25,35 from a front perspective (for the embodiment of FIGS. 1-2). The leg recesses, represented by lines 4,5, are preferably positioned closer to the central vertical plane (and closer to wheel 12) than the outer extent of the battery and/or the drive motors, and closer than the outer extent of the housing protrusions 21,31,22,32 that cover the battery and drive motors. Also, FIG. 3 illustrates, in phantom lines, indentations 41,42 (at least their lower part) and their position within the envelope of the wheel.

It should be recognized that while the drive motors are shown (in FIGS. 1-3) in the fore side of the leg recesses 23,33 and the batteries aft, these components could be switched in whole or in part such that the batteries are located fore and the drive motors aft, or some combination thereof, maintaining the leg recesses 23,33 substantially aligned with the heel region of their foot platforms. The circuit boards are shown positioned near their corresponding batteries, but may be otherwise located in the device, including mounted on a single circuit board. And the sensor 82 (shown with control circuit 80) may be otherwise located, including more centrally located, for example, with the housing between the leg recess 23,33. The housing 20 would preferably be modified to contour to the otherwise arranged components.

The leg recesses 23,33 may also include a pad and/or friction strips or the like for comfortable and helpful contact with the sides of a rider's lower leg.

Figure 4:
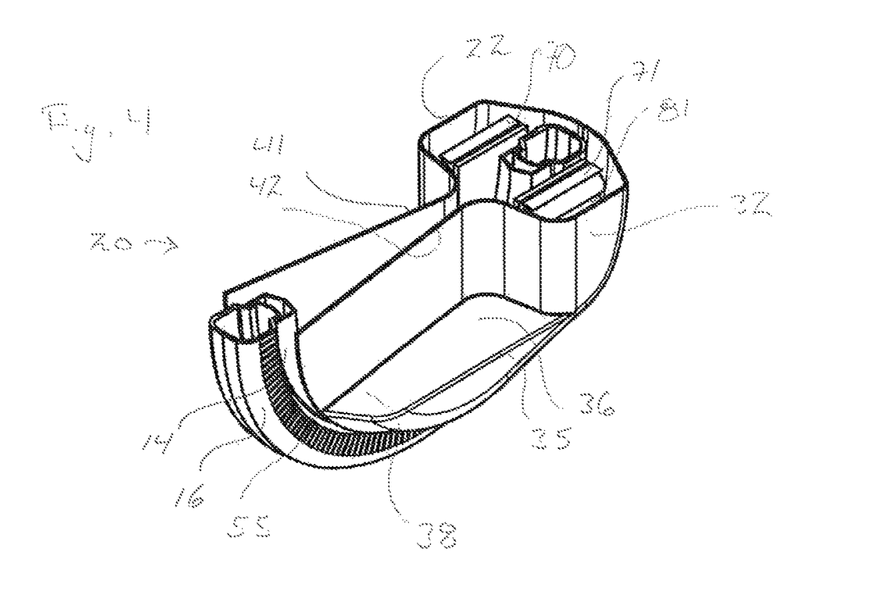

Referring to FIG. 4, a cross-sectional left-side perspective view of the lower portion of device 10 is shown. FIG. 4 illustrates indentation 41,42 of housing 20 into the envelope of the wheel. The indentation is formed proximate the heel region 36 of the foot platform 35 which allows the heel region to extend toward or into the wheel envelope and thereby for the advantages discussed herein to be achieved.

It should be recognized that the housing could be removed entirely between the left and right platform sections (providing, for example, a laterally continuous platform, at least in part), yet the provision of the indented housing sections 41,42 provides a fixed position point into which a rider may insert and "anchor" his or her heel—which may add to ease of mounting and use.

FIG. 4 also illustrates portions of batteries 70,71 and control circuit 81 within the housing. The rim 14 and tire 16 of wheel 12, and a drive track 55 formed on or with tire 16, are also shown.

Figure 5:
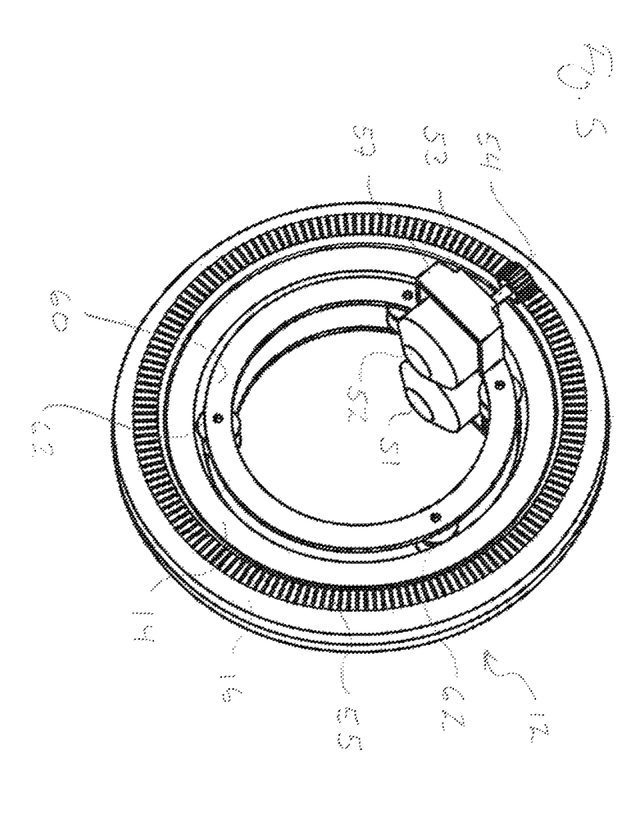

Referring to FIG. 5, a perspective view of wheel 12, drive motors 51,52 and support frame 60 and other components of the drive system of device 10 are shown. FIG. 5 illustrates an annular support frame 60 having a plurality of rotator wheels 62 that engage wheel rim 14 and about which wheel rim 14 rotates. Mounting bracket 57 extends from frame 60 and holds motors 51,52 in proper position so that the drive wheel 54, extending from drive shaft 53, contacts wheel 16 aligned in track 55. The motors may be biased toward positive contact with the wheel.

Drive wheel 54 preferably has teeth 57 that engage complementary recesses in track 55. This tooth and recess structure may be similar to that found on engine timing belts, in other words, a complementary tooth and recess arrangement as opposed to mere friction drive.

Drive motors 51,52 are coupled to the batteries 70,71 which supplies power, and to control circuits 80,81, respectively. Drive motors 51,52 are preferably high efficiency DC brushless motors. Suitable motors are known in the art. The drive speed of these motors may be monitored by control circuits 80,81 or otherwise to assure that they are rotating at approximately the same speed and/or exerting similar forces on tire 16—for efficiency of drive, low wear and correct function.

Track 55 may be formed in various ways, yet in a preferred embodiment, the track is formed integrally with the tire when the tire is molded. The track may include reinforcing or strengthening material of a type known to strengthen tires and/or belts.

Fore-aft balance and drive systems are known in the art. When a user leans the device forward, the motors drive the wheel forward. The greater the amount of forward lean, the greater the speed at which the wheel is driven. The same applies in the aft direction.

While FIG. 5 illustrates track 55 on the tire, it should be recognized that alternative embodiments could be used without departing from the present invention. They include, but are not limited to, fashioning the track on the rim and not the tire, or on both. Or using a no or less tooth pressure based friction drive.

Figure 6:
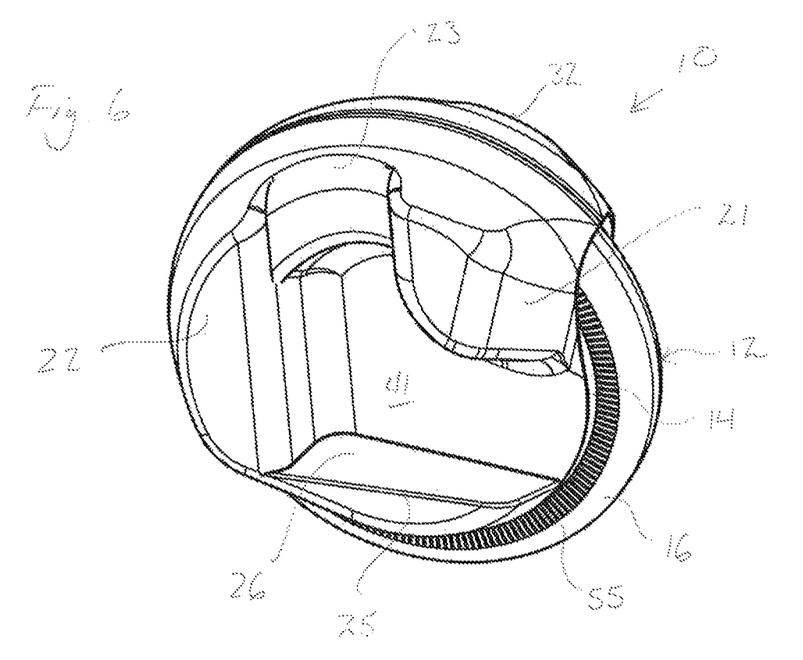

Referring to FIG. 6, a perspective view of device 10 with track 55 of wheel 12 in accordance with the present invention is shown. The embodiment of FIG. 6 is similar to that of FIGS. 1-2, yet illustrates portions of rim 14 and drive track 55.

The dual motors, batteries and control circuits provide an important redundancy to device 10. For example, in the event that a motor, battery or control circuit (or the connection therebetween) fails, the remaining motor, battery, control circuit are preferably programmed to detect the failure and slowly and safely bring the wheel to a stop, perhaps within 15-30 seconds. This allows for safe stopping and dismount of the device. In addition to orchestrating this slow and safe shut-down, the control circuit preferably emits an audible warning signal through a speaker that may be positioned on the circuit board with the control circuit or elsewhere.

Batteries 70,71 may be any suitable battery of the type used in fore-aft balancing personal transportation device (for example, lithium ion) and/or new battery technologies yet to come. Suitable batteries are known in the art. Control circuits 80,81 may include a position sensor 82 (sensor 82 is shown with control circuit 80). There may be one sensor or redundant sensors, for example, a sensor may be provided with control circuit 81, not shown in the figures yet preferably positioned symmetrically to sensor 82). The sensor(s) is/are preferably a 3-dimensional sensor (i.e., gyroscopic sensor) capable of sensing fore-aft position and side-to-side position. Such sensors are known in the art. The control circuits may include a processor (or other programmable electronic device), memory, power regulator and other known and/or standard electronic devices for control circuits of this type (e.g., receiving control signals and/or position data, and driving motors 51,52 in response thereto). These components may be mounted on a printed circuit board. Device 10 may be programmed such that when leaning into a turn, wheel speed is automatically reduced as discussed in U.S. Pat. No. 8,807,250, which is hereby incorporated by reference.

The wheel rim 14, frame 60 and mounting brackets 57 may be formed of a metal, such as aluminum. The housing may be formed of a suitable plastic.

The present invention includes use of a single wheel structure. For purposes of the present invention, a "single wheel structure" includes a structure that has a tire and rim and a single axis of rotation. This might be a single rim structure with two parallel-arranged tires mounted on it (the single rim structure providing the single axis of rotation) or a device with two separate rims, yet that are mounted adjacent to one another and have a common or shared axis of rotation.

Figure 7:
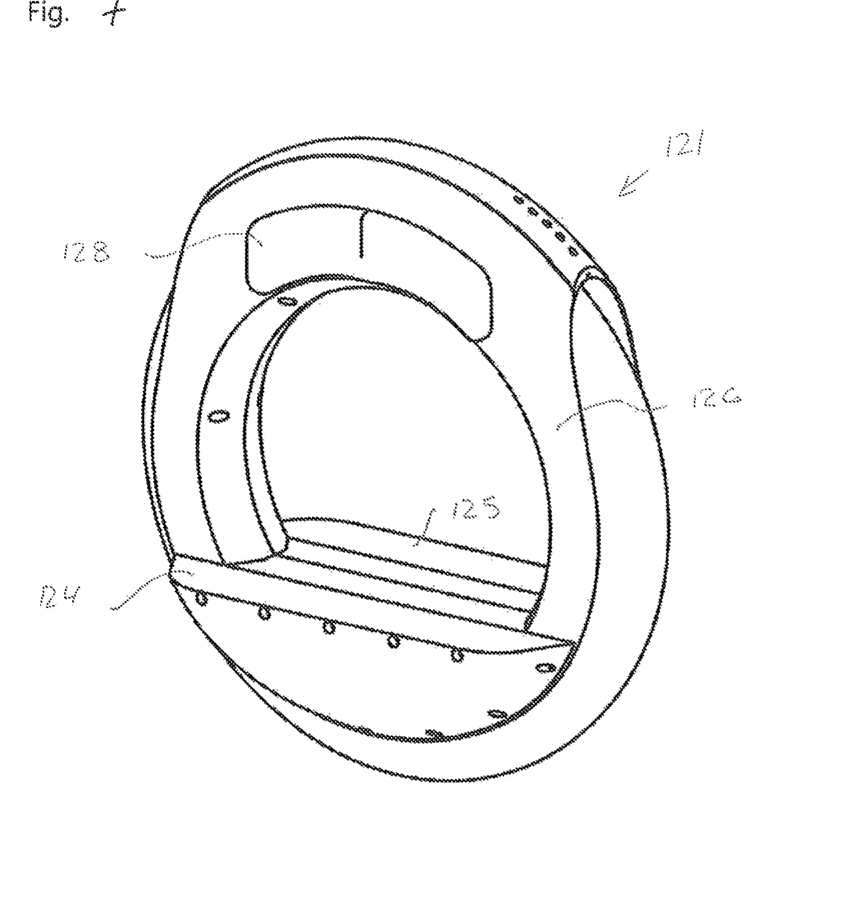
FIGS. 7-12 illustrate another embodiment of a single-wheel, self-balancing transportation device in accordance with the present invention, this embodiment having a low-wear drive mechanism.
Figure 8:
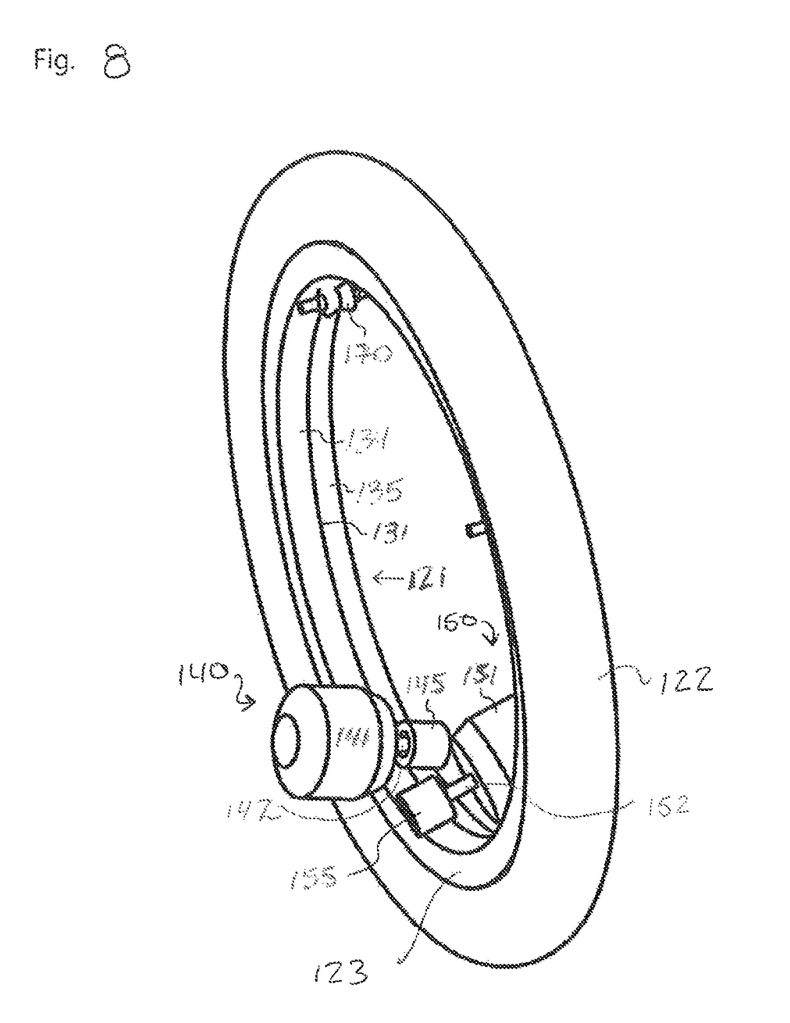
Figure 9:
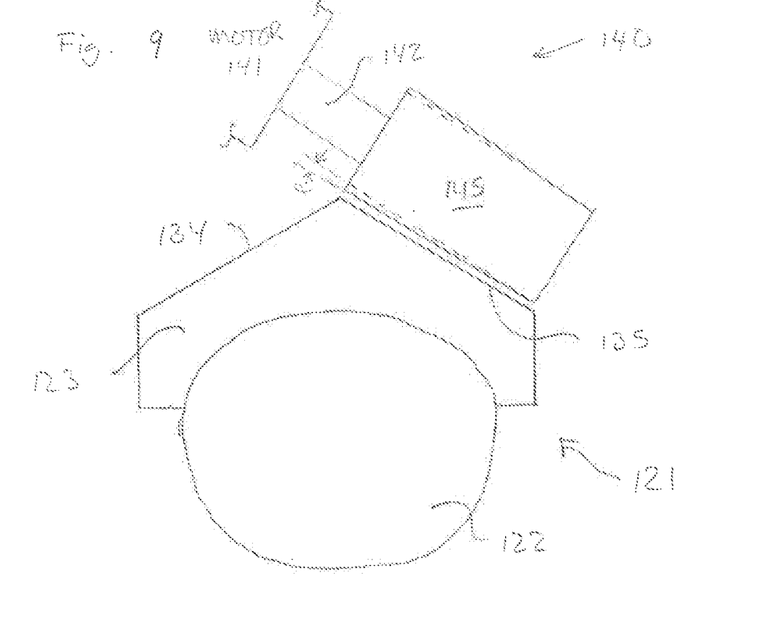

Referring to FIGS. 7-8, perspective views of another embodiment of a single wheel transportation device and a drive system therefor are shown. FIG. 7 shows the device 120 with the housing installed, while FIG. 8 shows the device with the housing and other components removed to better show the drive assemblies. FIG. 9 shows a cross-sectional view of one embodiment of a rim and drive member.

FIG. 7 illustrates wheel 121, two platforms 124,125, a frame 126 to which the platforms are attached, and leg contact pads or surfaces (hereinafter termed "leg contact members") 128.

FIG. 8 illustrates the tire 122 and rim 123 of wheel 121, two drive assemblies 140,150 and guide rollers 170. It can be see more clearly in FIG. 9 that rim 123 may have a ridge 131 that has a smaller diameter than at the lateral periphery of the rim 123, effectively defining two faces 134,135. Note that while ridge member 131 is shown having a relatively hard angle, this member may be more laterally expansive and/or have a flat or curved shape or be otherwise configured. An important feature regardless of the configuration of the ridge member is that two "faces" are created to which counter-acting "centering" forces may be respectively applied.

In the embodiment of FIG. 8, two motors 141,151 are provided. These motors have drive shafts 142,152 and drive members 145,155, respectively. The motors are preferably coupled into the wheel frame such that the drive members 145,155 contact faces 134,135, on opposite sides.

This arrangement provides several benefits, one of which is "centering" which is achieved by the two drive members providing substantially equal and opposite force to the two sides of the rim.

Drive assemblies 140,150 are mounted interiorly to the frame at an appropriate angle and position. The drive assemblies are mounted in the frame such that at rest, in this position, the drive members contact the rim. The amount of contact force or pressure exerted by the drive member on the rim at rest is minimal. The drive assemblies are mounted in the frame and the foot platforms are coupled to the frame such that as a user places their weight on the foot platforms, the weight of the user pushes the drive members into a higher friction (higher pressure) engagement of the rim. In a preferred embodiment, this "rim contact force" is proportional with the weight of the user, the heavier the user, the greater the contact force, the greater the friction. This is a preferred scenario because the wheel is driven with higher friction only when and as needed for a heavier person, thereby further reducing the amount of wear on the drive members.

Referring more specifically to FIG. 9, drive member 145,155 may be substantially cylindrical, and thereby improve significantly over the prior art. In a more preferred embodiment, however, the drive member may have a slight outward taper towards ridge member 131. If the drive members 145,155 are precisely cylindrical, a loss of efficiency may occur due to friction caused by the difference in diameter (and therefore difference in speed) between the ridge member 131 and edges of rim 123. The drive members may therefore have a slight taper to compensate for this difference. As shown in FIG. 5, drive member 145 has a larger diameter where the diameter of rim 123 is smaller (at the ridge member 131), and vice versa. This has the effect of negating the difference in speed between the ridge member and edges of rim 123.

This angle, α, may be a few degrees (preferably 0.5 to 5 or 1 to 3, or less, or other). In one representative embodiment, it is approximately 1 degree for a "face angle" of approximately 18 degrees.

A second drive assembly 150 is not shown in FIG. 9 for clarity of drawing. It is to be understood that it is there, oppositely arranged with drive assembly 140, and contacting face 134 (or a guide roller is there in its place, as discussed below).

Figure 10:
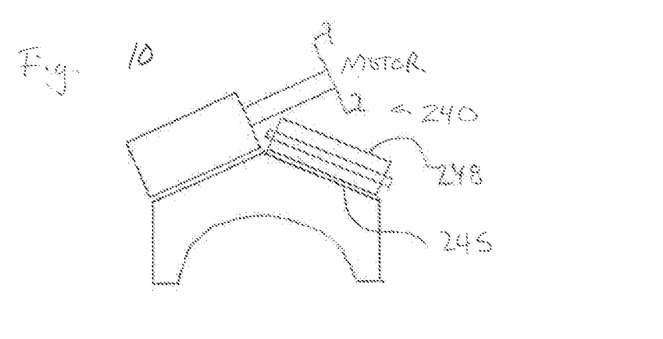

Referring to FIG. 10, an alternative embodiment is shown in which one drive assembly 240 is provided and a passive roller 248 is positioned to contact the rim face opposite the face contacted by drive member 245.

Figure 11:
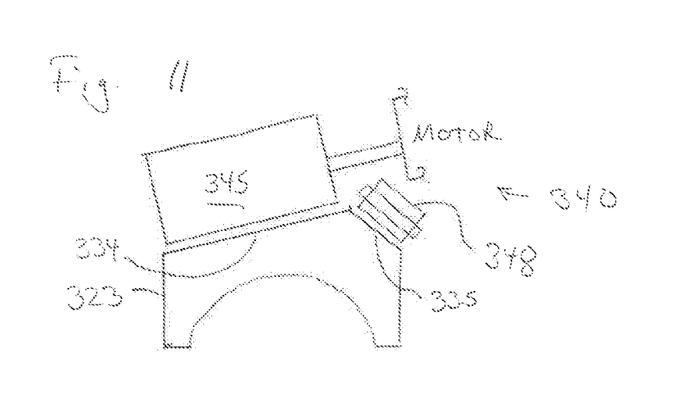

Referring to FIG. 11, the embodiment of FIG. 6 may be adjusted so that the drive member 345 and rim 323 are configured to increase the contact surface area and friction between the drive member and the rim face 334. Rim face 335 is accordingly smaller.

Figure 12:
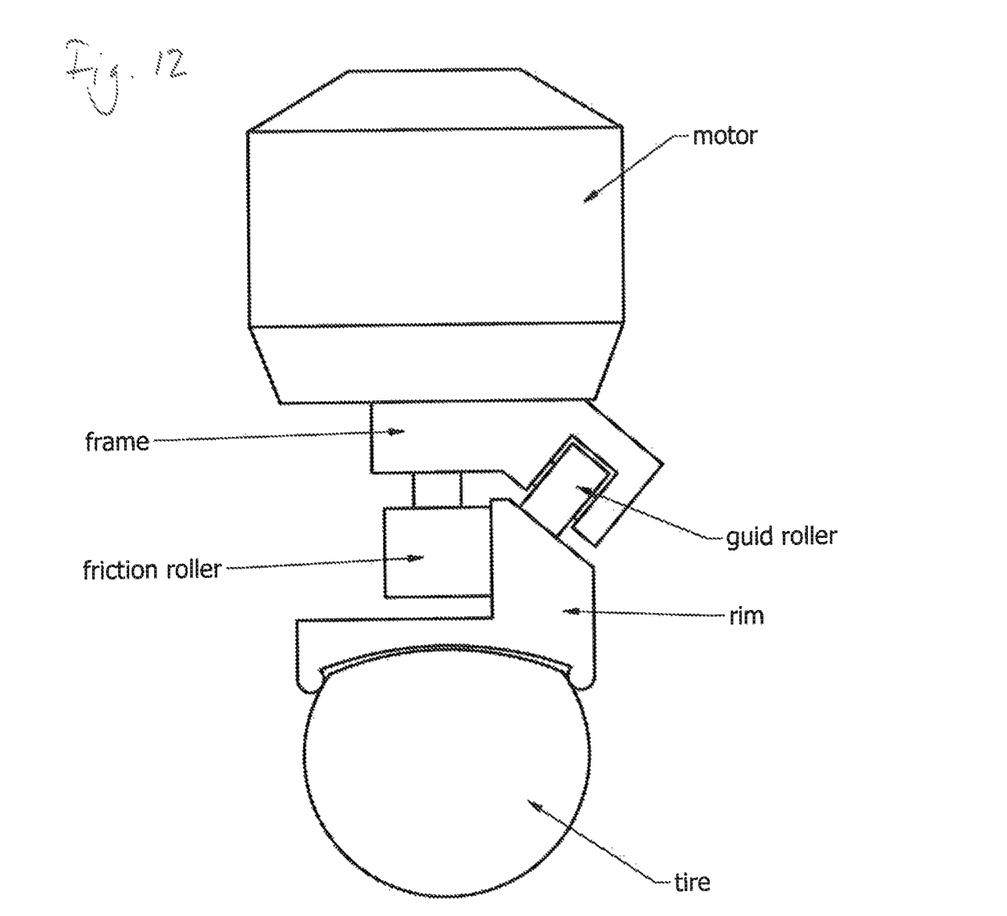

Referring to FIG. 12, another alternative embodiment of a drive assembly in accordance with the present invention is shown. In the embodiment of FIG. 12, the drive shaft and motor axis are substantially vertical (when the wheel is vertical) and the rim is configured with a annular face arranged to contact the drive member coupled to the drive shaft. In the embodiment of FIG. 8, the face has a similar orientation to the drive shaft, though both the orientation of the face and the drive shaft may differ without departing from the invention. A guide roller is preferably provided to push the rim into contact with the friction roller.

While the speed of two points on the annular face, for example, a point at the top of the friction roller and one at the bottom, will differ in their speed (a longer path for the bottom point), the difference is quite small compared to prior art arrangements, and thus wear is substantially more even and far slower and thus the drive mechanism functions longer, with greater precision and with greater energy efficiency.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A motorized, fore-aft self-balancing transportation device, comprising:
a single wheel structure having a wheel;
a position sensor;
a first drive motor, a first battery and a first control circuit, the first control circuit driving the wheel toward fore-aft self-balancing based on position information from the sensor;
first and second foot platforms located on opposite sides of the wheel, each having a heel region;
wherein one of the first drive motor and first battery are located forward or rearward in the device; and
wherein the first motor and the first battery are arranged in the device so that a first unrestricted open air leg recess and a second unrestricted open air leg recess are defined that are aligned substantially above the heel region of the first foot platform and the second foot platform, respectively.

2. The device of claim 1, wherein one of the first drive motor and first battery are located substantially forward in the device and the other of the first drive motor and first battery is located substantially rearward in the device, and they are spaced from one another to create an air gap at which the first leg recess, at least in part, is located.

3. The device of claim 1, wherein the wheel structure defines an envelope of the wheel, and the first heel region extends into that envelope, at least in part.

4. The device of claim 1, further comprising a housing that covers part of the first wheel and defines the first and second leg recesses; and
wherein there is a central vertical plane to the wheel in the line of direction of travel, and one of the first motor and first battery extends perpendicular from the central vertical plan a distance that is greater than the shortest length the leg recess extends perpendicular to the central vertical plane.

5. The device of claim 1, wherein the wheel includes a drive track that includes a series of distributed protrusions and recesses and wherein the first drive motor includes a shaft and drive head, the drive head having teeth that fit substantially complementary within the protrusions and recesses of the track, such that rotation of the drive shaft causes rotation of the drive head which in turn causes corresponding movement of the wheel.

6. The device of claim 5, wherein the first wheel has a rim and a tire, and the drive track is formed in the tire.

7. The device of claim 1, further comprising a second drive motor, a second battery and a second control circuit, the second control circuit driving the wheel toward fore-aft self-balancing based on position information from the sensor.

8. The device of claim 7, wherein the first and second control circuits are configured such that upon failure of one of the first or second drive mechanisms, the remaining functioning drive mechanism enters a slow shut down state and therein brings the first wheel to a slow and safe stop.

9. The device of claim 1, wherein the wheel defines a wheel envelope and at least one or the other of the first drive motor and the first battery are located substantially outside that envelope.

10. The device of claim 1, wherein both the first drive motor and the first battery are located substantially outside the envelope of the wheel.

11. A motorized, fore-aft self-balancing transportation device, comprising:
a single wheel structure that has a wheel and defines a wheel envelope;
a position sensor;
a first drive motor that drives the wheel, a first battery that supplies power to the first drive motor and a first control circuit coupled to the drive motor and first battery, the first control circuit driving the wheel toward fore-aft self-balancing based on position information from the sensor; and
first and second foot platforms located on opposite sides of the wheel, each having a heel region;
wherein at least one of the first drive motor and first battery are located substantially outside of the wheel envelope.

12. The device of claim 11, wherein the first motor is located substantially outside of the wheel envelope.

13. The device of claim 11, wherein the first battery is located substantially outside of the wheel envelope.

14. The device of claim 11, wherein both the first drive motor and the first battery are located substantially outside of the wheel envelope.

15. The device of claim 11, further comprising a housing that defines a first and a second unrestricted open-air leg recess that are aligned above the heel region of the first foot platform and the second foot platform, respectively.

16. A motorized, fore-aft self-balancing transportation device, comprising:
   a single wheel structure having a wheel and defining a wheel envelope;
   a position sensor;
   a first drive motor that drives the wheel, a first battery that supplies power to the first drive motor and a first control circuit coupled to the drive motor and battery, the first control circuit driving the wheel toward fore-aft self-balancing based on position information from the sensor; and
   first and second foot platforms located on opposite sides of the wheel, each having a heel region;
   wherein a portion of the first foot platform is located within the envelope of the wheel.

17. The device of claim 16, further comprising a housing that defines a first and a second unrestricted open-air leg recess that are aligned substantially above the heel region of the first foot platform and the second foot platform, respectively.

18. The device of claim 16, wherein the wheel includes a drive track that includes a series of distributed protrusions and recesses and wherein the first drive motor includes a shaft and drive head, the drive head having teeth that fit substantially complementary within the protrusions and recesses of the track, such that rotation of the drive shaft causes rotation of the drive head which in turn causes corresponding movement of the wheel.

19. A motorized, fore-aft self-balancing transportation device, comprising:
   a single wheel structure having at least a wheel;
   a position sensor;
   a first drive motor that drives the wheel, a first battery that supplies power to the first drive motor and a first control circuit coupled to the drive motor and battery, the first control circuit driving the wheel toward fore-aft self-balancing based on position information from the sensor; and
   first and second foot platforms located on opposite sides of the wheel, each having a heel region;
   wherein the wheel includes a drive track that includes a series of distributed protrusions and recesses and wherein the first drive motor includes a shaft and drive head, the drive head having teeth that fit substantially complementary within the protrusions and recesses of the track, such that rotation of the drive shaft causes rotation of the drive head which in turn causes corresponding movement of the wheel.

20. The device of claim 19, further comprising a second drive motor, a second battery and a second control circuit, the second control circuit driving the wheel toward fore-aft self-balancing based on position information from the sensor.

21. A motorized, fore-aft self-balancing transportation device, comprising:
   a single wheel structure having a wheel;
   a position sensor;
   a first drive motor, a first battery and a first control circuit, the first control circuit driving the wheel toward fore-aft self-balancing based on position information from the sensor;
   first and second foot platforms located on opposite sides of the wheel, each having a heel region; and
   a housing, covering at least a portion of the wheel, having a first set and a second set of housing protrusions located on opposite sides of the wheel, at least one protrusion in each set extending outwardly from a central vertical plane of the wheel to a position above and vertically over, at least in part, its respective foot platform;
   wherein the first set of housing protrusions defines a first open air leg recess aligned, at least in part, above the first foot platform and the second set of housing protrusions defines a second open air leg recess aligned, at least in part, above the second foot platform; and
   wherein at least one of the first set of protrusions houses at least part of one of the first drive motor, first battery, and first control circuit.

22. A motorized, fore-aft self-balancing transportation device, comprising:
   a single wheel structure having a wheel;
   a position sensor;
   a first drive motor, a first battery and a first control circuit, the first control circuit driving the wheel toward fore-aft self-balancing based on position information from the sensor;
   first and second foot platforms located on opposite sides of the wheel, each having a heel region; and
   a housing, covering at least a portion of the wheel and having first and second sides, the first side including front and rear housing protrusions that define therebetween a first open air leg recess;
   wherein the rear housing protrusion has a greater vertical dimension than the front housing protrusion.

23. The device of claim 22, wherein a front of the first foot platform extends below the front protrusion.

24. The device of claim 22, wherein the rear protrusion is located substantially rearward of the first foot platform.

25. The device of claim 22, wherein the first foot platform and the first open air leg recess are configured such that the leg recess contacts a rider's leg below the knee during use.

* * * * *